May 4, 1965  N. MOREAU ETAL  3,181,941
GLASS TUBE FORMING

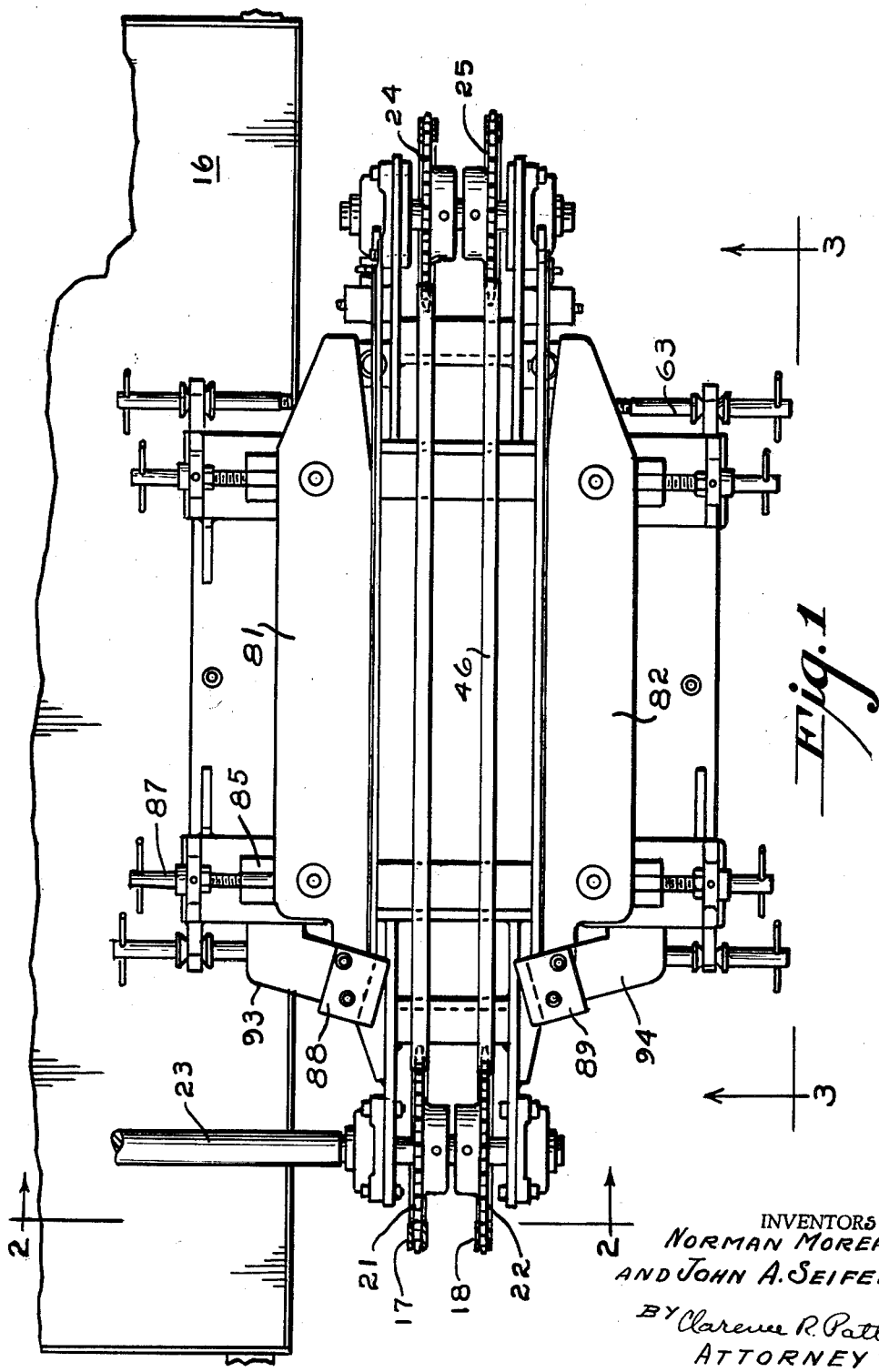

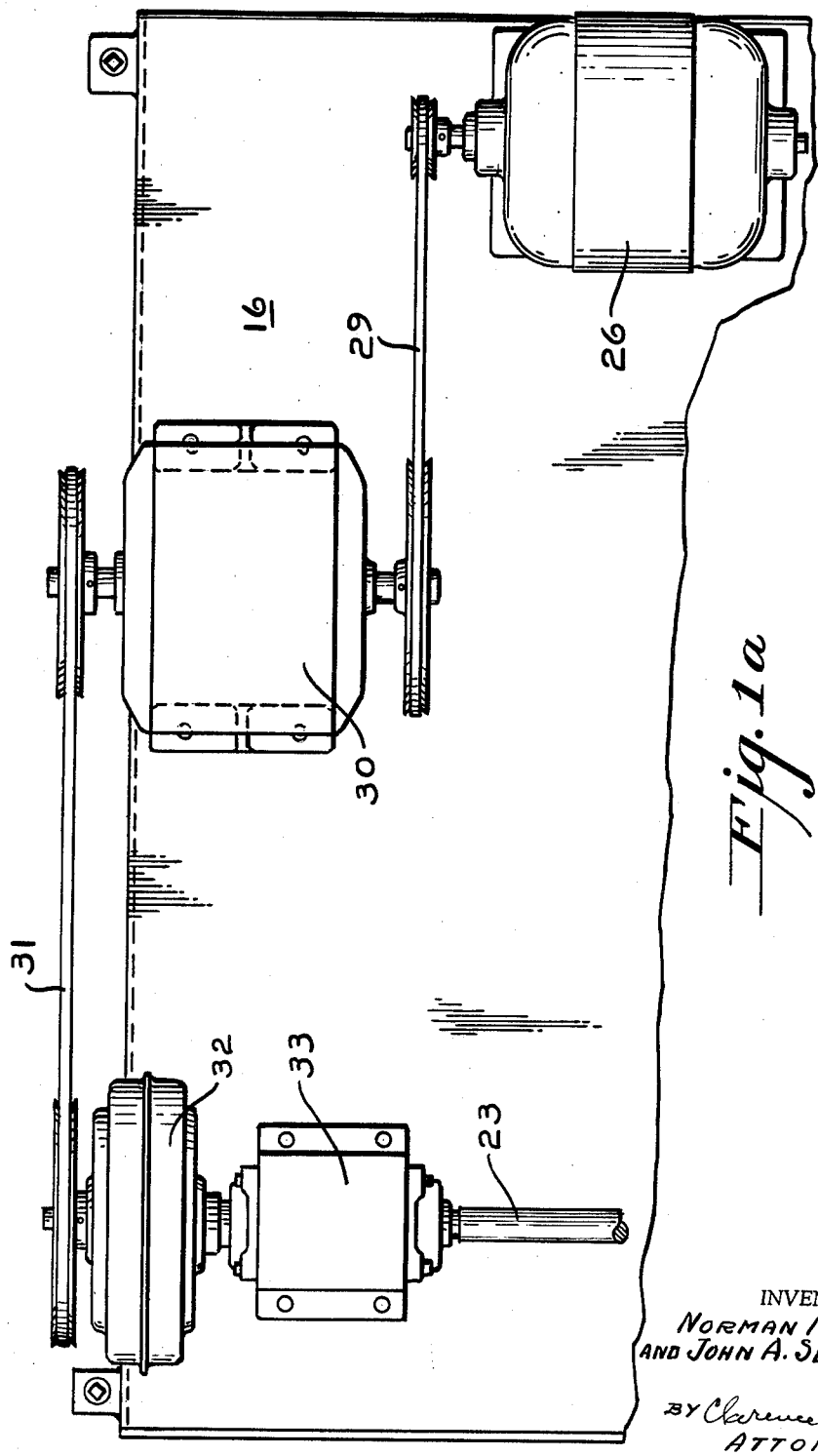

Filed Oct. 27, 1960  7 Sheets-Sheet 3

INVENTORS
NORMAN MOREAU
AND JOHN A. SEIFERT
BY
Clarence R. Patty, Jr.
ATTORNEY

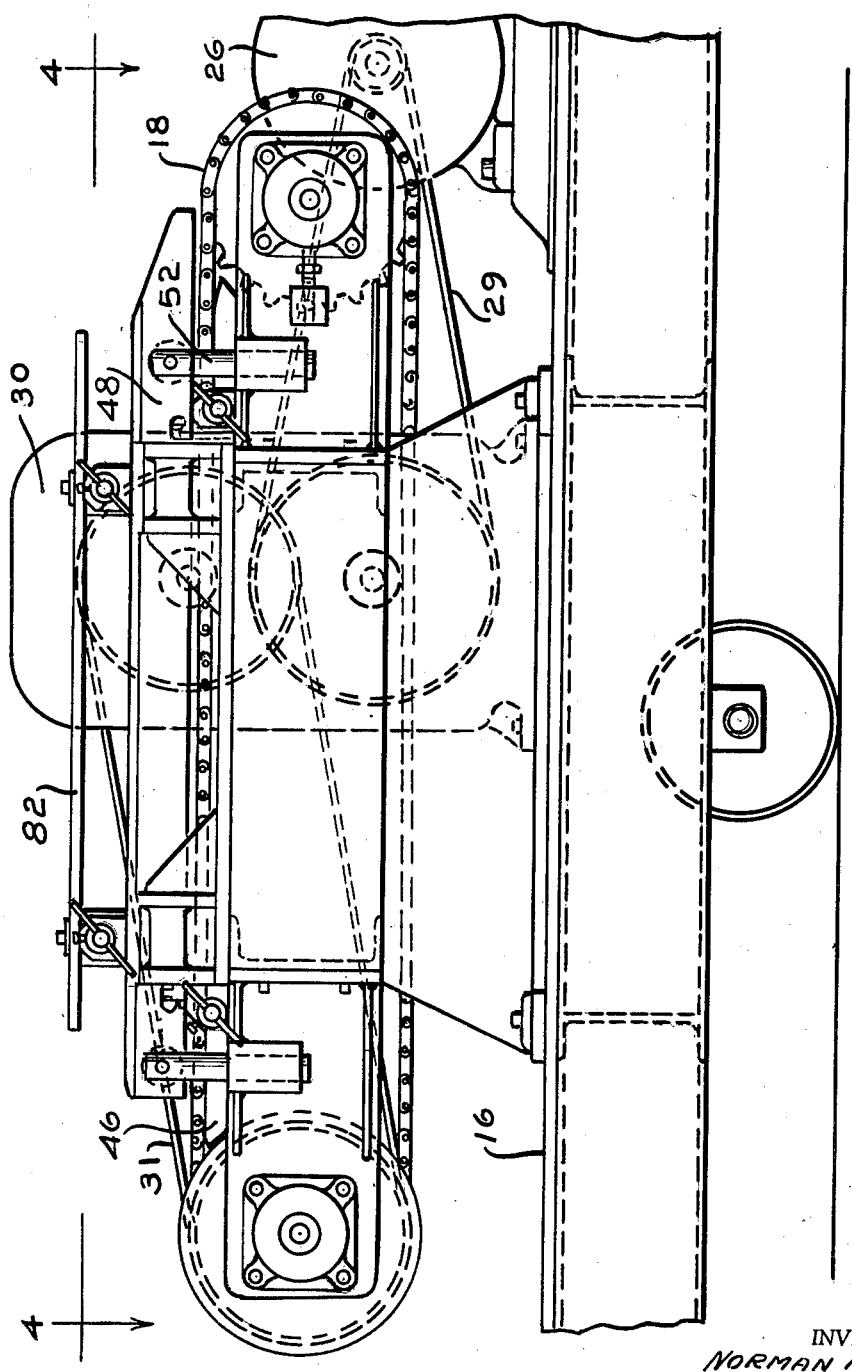

May 4, 1965
N. MOREAU ETAL
3,181,941
GLASS TUBE FORMING
Filed Oct. 27, 1960
7 Sheets-Sheet 5
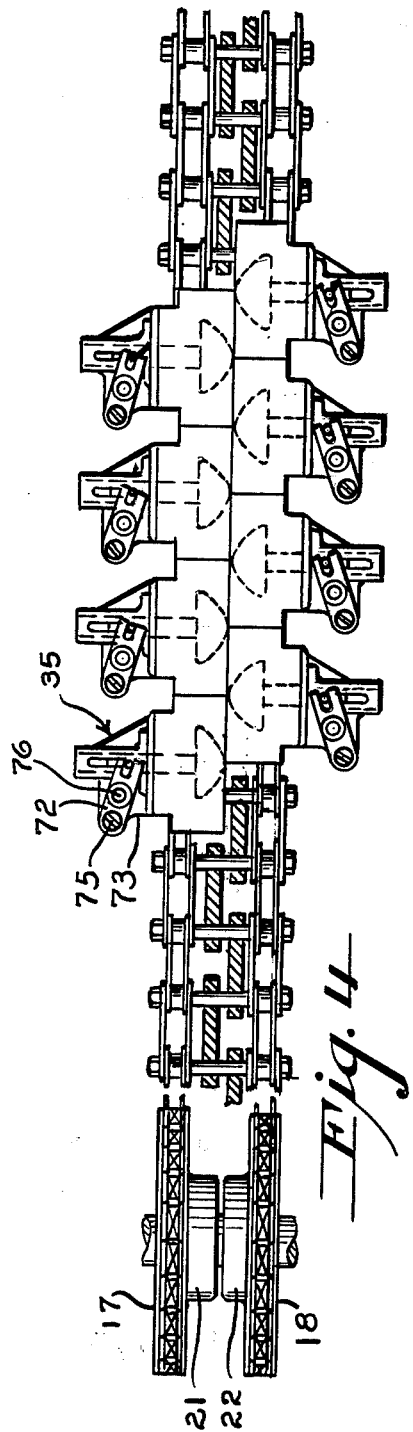
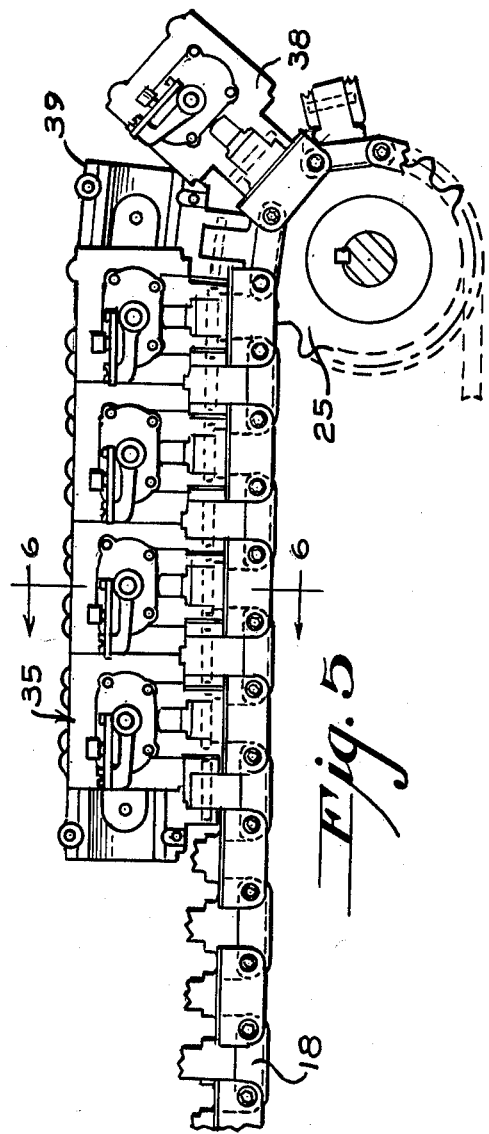
INVENTORS
NORMAN MOREAU
AND JOHN A. SEIFERT
BY
Clarence R. Patty, Jr.
ATTORNEY

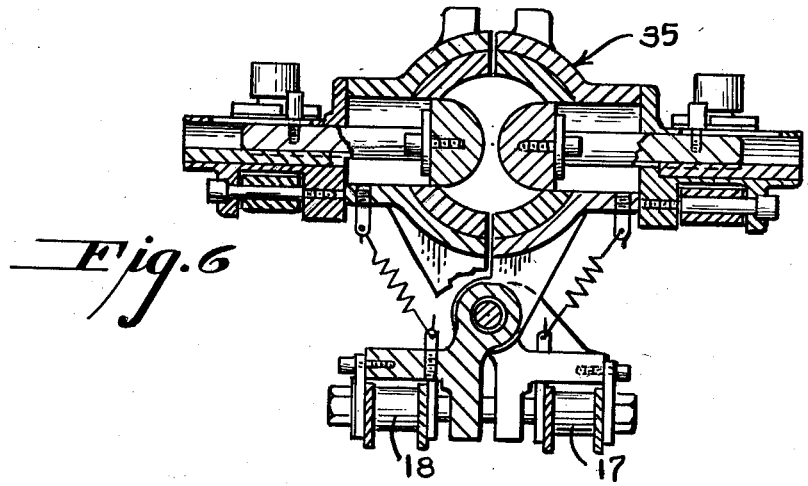
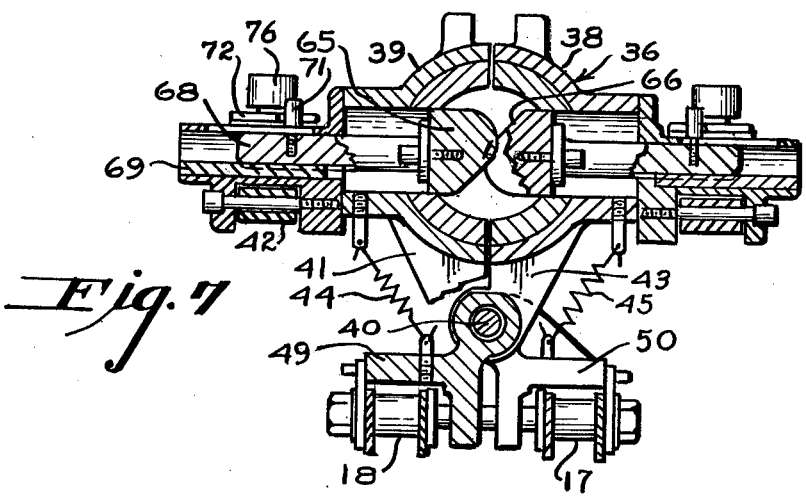
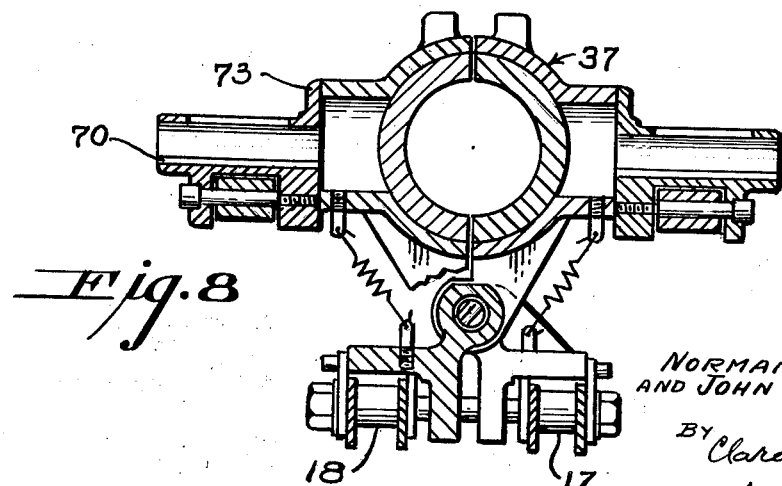

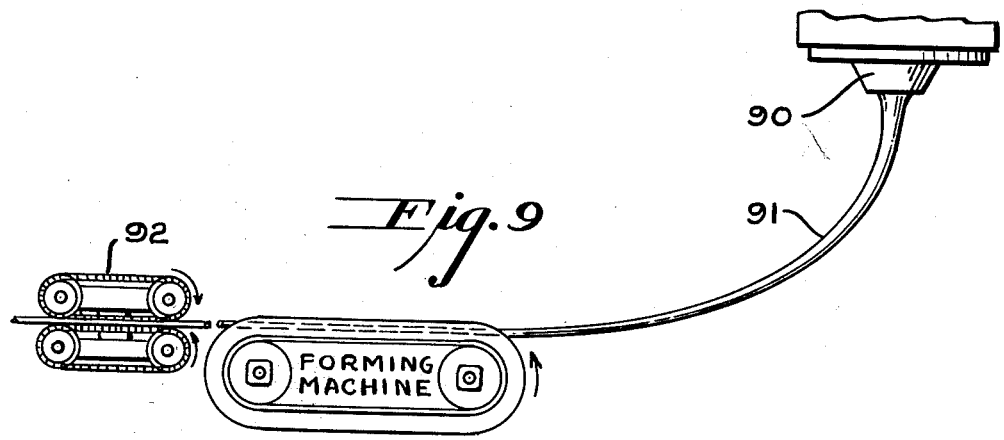
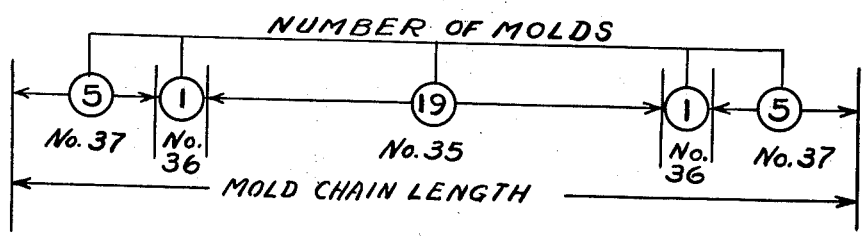

United States Patent Office 3,181,941
Patented May 4, 1965

3,181,941
GLASS TUBE FORMING
Norman Moreau, Lincoln, and John A. Seifert, Cranston, R.I., assignors to Corning Glass Works, Corning, N.Y., a corporation of New York
Filed Oct. 27, 1960, Ser. No. 65,339
3 Claims. (Cl. 65—187)

The present invention relates to a method of and apparatus for modifying the form of glass tubing while traveling from a source of formation toward a delivery position.

It has been discovered that tubular electric lamps, of greatly increased efficiency, can be obtained by imparting to their envelopes a configuration in which the perimeter-to-area ratio is greater than that of round tubes of like cross sectional area, and that such tubes have greater strength and higher resistance to implosion than simple flattened tubes. Preferred forms of such a tubular electric lamp are fully shown and described in United States Patent No. 2,915,664. A presently known method of and apparatus, respectively, for reforming individual glass tubes in the production of such lamps are disclosed in United States Patent Nos. 2,862,337 and 2,862,335.

According to the invention a tubular stream of molten glass issuing from a tube making forehearth and traveling toward a delivery position is, near its source, encircled with embracing members or cylindrical molds having passages through the walls thereof. Cams along the common path of travel of the stream and molds project tools through such passages to modify the form of the tubing in a desired manner. Before the path of travel of the molds divert from that of the tubular glass stream such tools are withdrawn and such molds separated to permit the tube to continue uninterruptedly on its course. In the meantime, the molds return to position for subsequent embracement of the oncoming tubing.

For a full understanding of the invention reference is made to the accompanying drawings.

In the drawings,

FIGS. 1 and 1a together comprise a plan view, partly in section, of a machine embodying the invention.

FIG. 3 is a view of the machine as seen when looking in the direction indicated in FIG. 1 by arrows 3—3.

FIG. 4 is a top plan view, on an enlarged scale and partly in section, of the chain of molds and of sprocket wheels about which the chains are trained.

FIG. 5 is a side elevational view of part of one of the chains with some of the molds shown and with mold halves completing an end turn about one of the sprocket wheels.

FIG. 6 is a sectional view taken on line 6—6 of FIG. 5.

FIGS. 7 and 8 are similar cross sectional views of other forms of molds employed.

FIG. 9 is a diagrammatic view showing the machine in association with a horizontal tube drawing forehearth and a tube drawing tractor.

FIG. 10 is a straight line diagram illustrating the combination of chain supported molds in the machine as illustrated.

Figure 2:
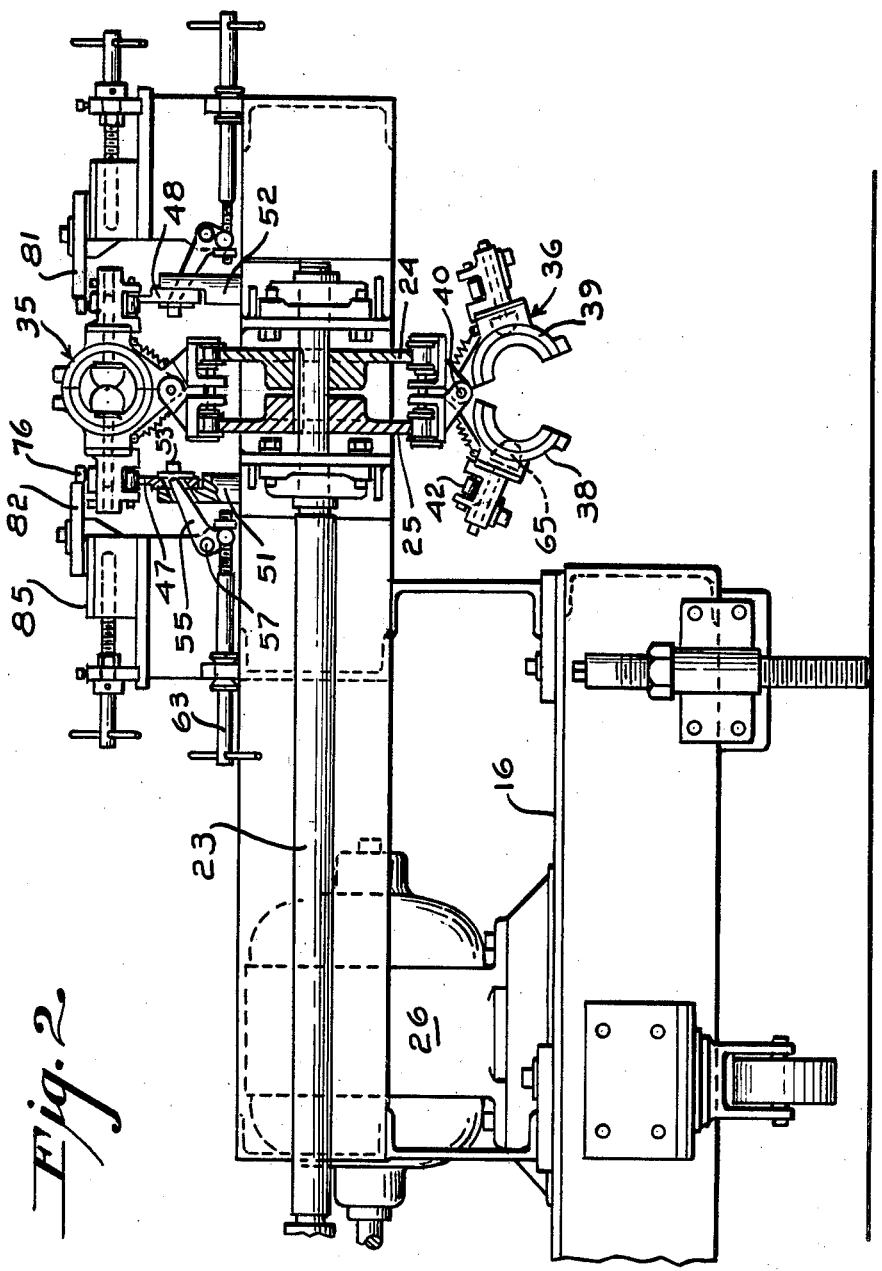
FIG. 2 is a view of a fragment of the machine, partly in section, as seen when looking in the direction indicated by arrows 2—2 in FIG. 1.

As will be observed from FIGS. 1, 1a and FIG. 3, a carriage 16 has arranged thereon endless chains 17 and 18 trained about drive sprocket wheels 21 and 22 and about idler sprocket wheels 24 and 25 respectively. Sprocket wheels 21 and 22 are suitably keyed to a shaft 23 driven by a motor 26 through the medium of a belt 29, a speed regulating unit 30, a belt 31, a speed reducing unit 32 and a bearing 33.

The chains 17 and 18, which between their sprocket wheels ride on rails such as 46 (FIGS. 1 and 3), carry the respective halves of axially split molds such as molds 35, 36 and 37, best illustrated in FIGS. 6, 7 and 8, respectively. As will be seen from FIGS. 4 and 5 the mold halves on the one side of their center line are axially shifted with respect to their mating halves on the other side. This is done owing to the staggered arrangement of the indentations to be made in opposite sides of the tubing. These molds comprise mold halves such as 38 and 39 (FIG. 7) each having a bracket such as 41 or 43 pivoted about a pin such as 40 passing through a chain supported mold mounting bracket such as 49 or 50 and each mold half having a roller such as 42. Springs such as 44 or 45 bias the mold halves to their open positions as shown in FIG. 2. To close the mold halves about the tubing as their path of travel joins that of the tubing there are provided cam tracks 47 and 48 (FIGS. 2 and 3) engageable by their rollers such as 42.

Cam tracks 47 and 48 are mounted on suitable upright guide posts 51 and 52 respectively and are held in properly adjusted positions by locking screws such as 53. To facilitate adjustment of cam tracks 47 and 48, they are provided with slots into which bell cranks such as 55 are projected. These bell cranks are pivoted as at 57 and are turned about their pivots by means of adjusting screws such as 63. When the proper positions of the cam tracks have been established the screws such as 53 are tightened.

Blank molds such as 37 (FIG. 8) serve as spacers and simply embrace the tubing along lengths thereof wherein no reforming of the tubing is to be effected, there being a number of these molds determined by the length of plain tubing it is desired to have between the respective reformed sections thereof.

Adjoining each end of a row of molds such as 37 is a mold 36, as shown in FIG. 7. Such a mold is provided with plungers 65 and 66 for reforming the tubing in a manner to form mercury pockets therein as required at each end of a fluorescent tube.

Each plunger such as 65 or 66 is locked against turning about the axis of its supporting slide rod such as 68 by a key such as 69 pressed into a groove in such rod and slidable in a groove such as 70 (FIG. 8) in a bracket such as 73 attached to the mold half and occupied by rod 68. In and out movement of a plunger is accomplished by means of an actuator pin 71 passing through a slot in bracket such as 73 and threaded into rod 68. Pin 71 is straddled by the end of an actuator arm such as 72 as best shown in FIG. 4. The arms such as 72 are pivoted as at 75 and carry operating rollers such as the roller 76. As best illustrated in FIGS. 1 and 2 cam tracks 81 and 82 are arranged for engagement of the rollers such as 76 while a mold embraces the tubing. Cam tracks 81 and 82 are mounted on suitable transverse slide ways such as 85 and are laterally adjustable by means of screws such as 87. The molds such as 35 (FIG. 6) are identical to those such as 36 except for the difference in their plunger shape.

Before a mold arrives at the end of its travel with the tubing the rollers such as 76 travel off the end of the cam tracks 81 and 82 and encounter plunger pull out cams 88 (FIG. 1) and 89, mounted on brackets 93 and 94, respectively, and which withdraw the plungers from association with the tubing before the mold arrives at the region of sprocket wheels 21 and 22 and start to be separated from one another under the influence of springs such as 44 and 45 as the rollers such as 42 become disengaged from cam tracks 47 and 48.

Referring now to FIG. 9 a forehearth 90 has been shown having a tubular stream 91 of glass issuing therefrom being horizontally drawn by a tractor 92, but which may be dispensed with while employing applicant's forming machine. As the tubing passes through such machine the respective molds close thereabout and the tubing is formed with pockets while embraced with molds such as 35 and 36 in a manner clear from the preceding description.

Referring now to FIG. 10, it will be seen that in the particular embodiment of the invention illustrated, there is a series of nineteen molds such as 35 flanked on either side by a mold 36, with the space between molds 36 separated by ten blank molds 37. There will accordingly be one section of tubing formed for each complete cycle of travel of the chains 17 and 18.

Although the invention is illustrated as applied to horizontal drawing of tubing, it obviously is not limited to such use, since if desired, the machine may equally well be mounted vertically and fed with tubing either from an up-draw or a down-draw source without departing from the invention as described and hereinafter claimed. Moreover, although a tractor is illustrated as used as is common practice in drawing tubing, it will be appreciated that applicant's machine is itself a tractor and may be so employed in the drawing of tubing horizontally or vertically; and that when used with a down-draw system may even be employed in a manner to counteract the tendency of acceleration of rate of draw otherwise resulting from the weight of the pendant glass tubing issuing from such a system.

What is claimed is:

1. An apparatus for shaping a cylindrical glass body during its travel from its source of formation to a delivery position to provide aligned re-entrant spaced apart grooves extending longitudinally along at least one side of the body, comprising axially separable molds having tubular cavities with transverse passages through their walls, means for conveying said molds coaxially along the path of such body, means for closing said molds about such body while coaxial therewith, means for reopening said molds, tools for introduction through such passages to form such spaced apart grooves in the body, means for projecting such tools through the mold passages while the molds are closed about the body to form such re-entrant spaced apart grooves therein and means for restoring said tools to their initial positions while such molds are still closed about such body.

2. Glass working apparatus which includes an axially separable mold having a tubular cavity with a transverse passage through a wall thereof, means for conveying said mold coaxially along the path of a hollow glass stream while traveling from its source of formation towards a delivery position, means for closing said mold about the stream, means for opening such mold from about the stream, glass stream shaping means movable into and out of the stream via such passage while said mold is closed and means for so moving it.

3. In a glass working machine, an endless chain, drive and driven sprocket wheels about which such chain is trained, means for continuously driving said chain, a series of axially split tubular bore molds along said chain arranged for closure about a common center line in end to end relation, means normally tending to hold said molds in open positions, means for directing a tubular stream of glass along a path of travel in common with the molds, means for closing said molds about the stream to embrace it as they enter their common path, plungers accessible to the stream through transverse passages in such molds, and means for moving such plungers into and out of the stream while embraced by such molds.

References Cited by the Examiner
UNITED STATES PATENTS

| | | | |
|---|---|---|---|
| 275,562 | 4/83 | Atterbury | 65—365 |
| 1,425,746 | 8/22 | Byrnes | 65—63 |
| 1,766,638 | 6/30 | Howard | 65—63 |
| 1,892,126 | 12/32 | Bailey | 65—78 |
| 2,065,305 | 12/36 | Dichter | 65—109 |
| 2,077,827 | 4/37 | Dichter | 65—244 |
| 2,166,871 | 7/39 | Luertzing | 65—87 X |
| 2,172,899 | 9/39 | Barnard | 65—187 X |
| 2,187,432 | 1/40 | Powers | 65—21 |
| 2,367,495 | 1/45 | Gray | 65—279 |
| 2,462,808 | 2/49 | Danner | 65—187 |
| 2,502,312 | 3/50 | Danner | 65—184 |
| 2,504,426 | 4/50 | Keyzer | 65—108 |
| 2,545,728 | 3/51 | Everett | 65—110 |
| 2,613,479 | 10/52 | Stong | 65—108 |
| 2,862,337 | 12/58 | Shaw et al. | 65—108 |
| 2,993,301 | 7/61 | Muller et al. | 65—32 |

FOREIGN PATENTS

| | | |
|---|---|---|
| 329,941 | 5/30 | Great Britain. |
| 506,384 | 9/30 | Germany. |
| 704,718 | 2/54 | Great Britain. |

DONALL H. SYLVESTER, *Primary Examiner.*
ARTHUR P. KENT, *Examiner.*